United States Patent Office 3,223,701

Patented Dec. 14, 1965

3,223,701
STEROIDO-[3,2-c] PYRAZOLES AND PREPARATION THEREOF

Ralph F. Hirschmann, Scotch Plains, N.J., assignor to Merck & Co., Inc., Rahway, N.J., a corporation of New Jersey No Drawing. Filed June 28, 1963, Ser. No. 291,292
5 Claims. (Cl. 260—239.5)

This invention relates to a novel process for the preparation of 11β,17α,21-trihydroxy-6,16α-dimethyl-20-oxo-2′-phenyl-4,6-pregnadieno-[3,2-c]pyrazole, starting from 6α,16α-dimethyl-4-pregnene-3,20-dione.

According to the process of my invention 6α,16α-dimethyl-4-pregnene-3,20-dione is converted to 6,16α-dimethyl-3,11-dioxo-4,6,17(20)-pregnatriene - 21 - oic acid methyl ester following in detail procedures shown in Examples 1 to 4.

The 6,16α-dimethyl-3,11-dioxo-4,6,17(20)pregnatriene-21-oic acid methyl ester which has the following structure:

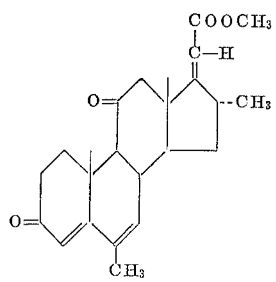

is then reacted with ethyl formate and sodium hydride in an inert atmosphere to form the corresponding 2-hydroxymethylene-derivative. The latter compound is then reacted with phenylhydrazine in an inert atmosphere to form the 2′-phenyl-[3,2-c]pyrazole which has the following structure:

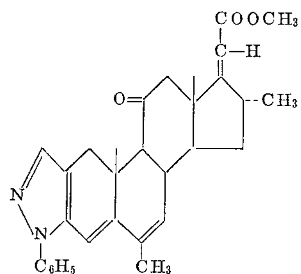

The above compound is reduced to the corresponding 21-hydroxy-derivative for example, using lithium aluminum hydride. The 21-hydroxy-compound is then converted to the corresponding 21-acetate which has the following structure:

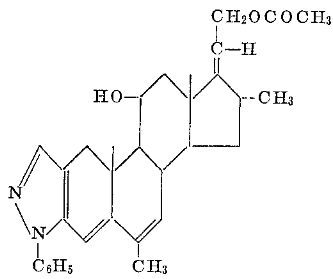

The above compound is oxidized with osmium tetroxide for example to give 11β,17α,21-trihydroxy-6,16α-dimethyl-20-oxo-2′-phenyl-4,6 - pregnadieno - [3,2 - c]pyrazole 21 acetate which on treatment with sodium methoxide in methanol at room temperature removes the 21-acetate.

The 11β,17α,21-trihydroxy-6,16α-dimethyl-20-oxo - 2′-phenyl-4,6-pregnadieno-[3,2-c]pyrazole produced in accordance with the present invention possesses high anti-inflammatory activity, and is especially effective for the treatment of arthritis and related diseases since it can be administered for its cortisone-like action in low dosage thereby minimizing undesirable side effects.

The following examples illustrate methods of carrying out the present invention but it is to be understood that these examples are given for purposes of illustration and not of limitation.

*Example 1*

A mixture of 6α,16α-dimethyl-4-pregnene-3,20-dione (1 g.), chloranil (2 g.), ethyl acetate (25 ml.), and acetic acid (5 ml.), is heated to boiling under nitrogen for 10 hours and then poured into water. The mixture is repeatedly extracted with ethyl acetate, and the combined extracts are washed with cold 10% sodium hydroxide until the alkaline wash is colorless, and finally to neutrality with water. The ethyl acetate solution is dried and the residue is crystallized from a mixture of acetone-ether to afford 6,16α-dimethyl-4,6-pregnadiene-3,20-dione.

*Example 2*

A spore suspension is prepared in water from a slant of *Aspergillus ochraceus* (NRRL 405) and used to inoculate a 250 ml. Erlenmeyer flask containing 50 ml. of medium of the following composition:

2% Edamin
2% Glucose
0.5% Corn steep liquor

The inoculated flask is incubated at 28° C.on a rotary shaker for 24 hours. The steroid substrate, 6,16α-dimethyl-4,6-pregnadiene-3,20-dione is added as a dimethylformamide solution (100 mg./ml.) to yield the equivalent of 1.0 g./l. of broth (0.5 ml./flask). After an additional incubation of 24 hours under the same environmental conditions as the growth phase, the broth is harvested and the desired product isolated.

Fifty milliliters of broth charged with 50 mg. of 6,16α-dimethyl-4,6-pregnadiene-3,20-dione and incubated as shown above is extracted with 3 x 20 ml. of ethyl acetate. The extract is vacuum concentrated to an oil, the oil dissolved in a few drops of chloroform and the latter solution chromatographed on paper in the system Skelly B - benzene (1:1)/dimethylformamide - methanol (1:1). Some unreacted starting material is found at the solvent front.

A 325 ml. broth composite from an incubation of 480 mg. of 6α,16α-dimethylprogesterone is extracted with 3 x 325 ml. of ethyl acetate. The extract is water washed and vacuum concentrated to a small volume. Paper chromatography in the system n-hexane-benzene (1:1)/dimethylformamide-methanol (1:1) showed the expected spot of 6,16α-dimethyl-11β-hydroxy - 4,6 - pregnadiene-3,20-dione.

The reaction product is dissolved in 20 ml. of benzene and charged to a column containing 50 g. of acid washed alumina. The column is washed with benzene and the unreacted starting material eluted with an ethyl ether-benzene mixture. The development is continued with a mixture of ethyl ether-ethyl acetate and finally with ethyl acetate alone which eluted the 6,16α-dimethyl-11β-hydroxy-4,6-pregnadiene-3,20-dione.

*Example 3*

A solution of 400 mg. of 6,16α-dimethyl-11β-hydroxy-4,6-pregnadiene-3,20-dione in 4 ml. of pyridine is added to the complex formed by the addition of 400 mg. of chromium trioxide to 4 ml. of pyridine. The mixture is swirled until thoroughly mixed and then allowed to stand at room temperature over night. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom under vacuum, and the residual crystalline material is purified by crystallization from a mixture of ethyl acetate and ether to give 6,16α-dimethyl-4,6-pregnadiene-3,11,20-trione.

*Example 4*

To a solution of 8.2 g. (0.025 mole) of 6,16α-dimethyl-4,6-pregnadiene-3,11,20-trione in 125 ml. of anhydrous tertiary butyl alcohol is added with stirring over a period of 15 minutes, with addition of reactants at above 50° C. and then, while stirring, allowing the temperature to drop to about 25° C., 13.6 ml. (0.100 mole) of ethyl oxalate and 20 ml. (0.062) mole) of 3.15 N solution of sodium methoxide in methanol at about fifty degrees centigrade, whereupon a heavy precipitate begins to appear immediately. The mixture is stirred for twenty hours, with the exclusion of moisture, whereafter a solution of 3.06 grams of sodium acetate and 3.53 milliliters of glacial acetic acid in 200 milliliters of methanol is added thereto. The precipitate is redissolved and the resulting solution turns dark brown.

This solution is cooled to about five degrees centigrade with an ice bath and a solution of 10.8 grams (0.0675 mole) of bromine in 108 milliliters of methanol is added during the next half hour. The amount of bromine to be added is determined by the color of the reaction mixture which progressively lightens during the course of the bromine addition until the solution is colorless. When the bromine color appears to persist, no further bromine is added.

To this solution is added, over a period of 3 hours, 45 millileters (0.142 mole) of a 3.15 normal methanolic solution of sodium methoxide whereupon the mixture turns deep orange and then lightens to a cloudy amber solution. The solution is stirred for five hours at room temperature. A 0.1 mole portion dissolved in a mixture of fifty milliliters of benzene, 25 milliliters of methanol and 80 ml. of acetic acid, about 2.4 grams of zinc dust is then added to the solution and the whole is stirred vigorously for 30 minutes. The resulting reaction product is poured into about 1500 ml. of water, washed and dried.

*Example 5*

6,16α - dimethyl - 3,11 - dioxo - 4,6,17(20)pregnatriene-21-oic acid methyl ester (1.350 g.) of Example 4 is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give the 2-hydroxymethylene-derivative.

*Example 6*

A solution of 1 millimole of 6,16α - dimethyl - 3,11 - dioxo - 2 - hydroxymethylene - 4,6,17(20)pregnatriene - 21-oic acid methyl ester in glacial acetic is treated with 1.01 millimoles of phenylhydrazine at room temperature (under nitrogen) for one half hour. Water is added and the resulting 6,16α-dimethyl-11-oxo-21-oic acid methyl ester - 2′ - phenyl - 4,6,17(20)pregnatrieno - [3,2 - c]-pyrazole is removed by filtration.

*Example 7*

A solution of 1.5 g. of 6,16α-dimethyl-11-oxo-21-oic acid methyl ester - 2′ - phenyl - 4,6,17(20)pregnatrieno - [3,2-c]pyrazole in a mixture of dioxane-benzene is added dropwise to a stirred mixture of 1.5 g. lithium aluminum hydride and 50 ml. anhydrous ether. When the addition is complete the mixture is refluxed for one half hour and then cooled; ethyl acetate is then cautiously added to the stirred mixture followed by water and then 250 ml. methylene chloride. The mixture is centrifuged and the organic layer is dried. The solvent is distilled to afford 11β,21 - dihydroxy - 6,12α - dimethyl - 2′ - phenyl - 4,6,17(20)pregnatrieno-[3,2-c]pyrazole.

*Example 8*

About 0.5 g. of 11β,21 - dihydroxy - 6,16α - dimethyl - 2′ - phenyl - 4,6,17(20)pregnatrieno - [3,2 - c]pyrazole is treated with 5 ml. pyridine and 2 ml. acetic anhydride at room temperature over night; the solvents are removed, water is added and the product is filtered, washed and dried to give 11β,21 - dihydroxy - 6,16α - dimethyl - 2′ - phenyl - 4,6,17(20)pregnatrieno - [3,2 - c]pyrazole 21 - acetate.

*Example 9*

To a stirred mixture of 0.00033 mole of 11β,21-dihydroxy - 6,16α - dimethyl - 2′ - phenyl - 4,6,17(20)pregnadieno-[3,2-c]pyrazole 21-acetate and 2 ml. t-butyl alcohol is added 0.26 ml. of 2.6 M of hydrogen peroxide in t-butyl alcohol, and 0.3 ml of a mixture 1.0 g. of osmium tetroxide in 100 ml. of t-butyl alcohol. An additional 0.5 ml. of the osmium tetroxide solution is then added over a period of 30 hours. After an additional 84 hours, water and methylene chloride are added. Organic solvents are removed under vacuum. The product is extracted with methylene chloride and taken to dryness. The residue is dissolved in 5 ml. of methanol, 1 ml. of aqueous sodium bisulfite is added, and the mixture is heated at 100° C. for one half hour. Extraction with methylene chloride affords 11β,17α,21-trihydroxy-6,16α-dimethyl - 20 - oxo - 2′ - phenyl - 4,6 - pregnadieno - [3,2-c]pyrazole 21-acetate.

A 500 mg. aliquot of the above compound is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water filtered and dried to constant weight to give 11β, 17α,21 - trihydroxy - 6,16α - dimethyl - 20 - oxo - 2′ - phenyl - 4,6 - pregnadieno - [3,2 - c]pyrazole.

Various changes and modifications may be made in carrying out the present invention without departing from the spirit and scope thereof. Insofar as these changes and modifications are within the purview of the annexed claims, they are to be considered as part of my invention.

I claim:

1. 6,16α - dimethyl - 3,11 - dioxo - 4,6,17(20) pregnatriene - 21 - oic acid methyl ester.

2. 6,16α - dimethyl - 3,11 - dioxo - 2 - hydroxymethylene - 4,6,17(20)pregnatriene - 21 - oic acid methyl ester.

3. 6,16α - dimethyl - 11 - oxo - 21 - oic acid methyl ester - 2′ - phenyl - 4,6,17(20)pregnatrieno - [3,2 - c] pyrazole.

4. 11β,21 - dihydroxy - 6,16α - dimethyl - 2′ - phenyl - 4,6,17(20)pregnatrieno - [3,2 - c]pyrazole.

5. 11β,21 - dihydroxy - 6,16α - dimethyl - 2′ - phenyl - 4,6,17(20)pregnatrieno - [3,2 - c]pyrazole 21 - acetate.

References Cited by the Examiner

UNITED STATES PATENTS

| | | | |
|---|---|---|---|
| 2,602,769 | 7/1952 | Murray et al. | 195—51 |
| 2,715,640 | 8/1955 | Ralls | 290—397.45 |
| 2,891,079 | 6/1959 | Dodson et al. | 260—397.4 |
| 3,005,838 | 10/1961 | Lincoln et al. | 260—397.45 |
| 3,072,640 | 1/1963 | Hirschmann et al. | 260—239.5 |
| 3,087,925 | 4/1963 | Christensen et al. | 260—239.55 |

OTHER REFERENCES

Dodson et al. (I) J.A.C.S. 81 pp. 1224–27 (1959).

Fieser et al., Steroids, pp. 692–696 (1959) Reinhold Pub. Co., New York.

LEWIS GOTTS, *Primary Examiner.*